(12) United States Patent
Bech

(10) Patent No.: US 9,073,270 B2
(45) Date of Patent: Jul. 7, 2015

(54) METHOD OF MANUFACTURING A WIND TURBINE BLADE BY EMBEDDING A LAYER OF PRE-CURED FIBRE REINFORCED RESIN

(75) Inventor: Anton Bech, Ringkøbing (DK)

(73) Assignee: Vestas Wind Systems A/S, Aarhus N. (DK)

( * ) Notice: Subject to any disclaimer, the term of this patent is extended or adjusted under 35 U.S.C. 154(b) by 914 days.

(21) Appl. No.: 13/144,799

(22) PCT Filed: Jan. 21, 2010

(86) PCT No.: PCT/DK2010/050012
§ 371 (c)(1),
(2), (4) Date: Oct. 14, 2011

(87) PCT Pub. No.: WO2010/083840
PCT Pub. Date: Jul. 29, 2010

(65) Prior Publication Data
US 2012/0039720 A1 Feb. 16, 2012

Related U.S. Application Data

(60) Provisional application No. 61/205,721, filed on Jan. 21, 2009.

(30) Foreign Application Priority Data

Jan. 21, 2009 (DK) .................................. 2009 00089

(51) Int. Cl.
*F03D 1/06* (2006.01)
*B29C 70/30* (2006.01)
(Continued)

(52) U.S. Cl.
CPC .............. *B29C 70/30* (2013.01); *F03D 1/0675* (2013.01); *B29B 11/16* (2013.01); *B29C 70/86* (2013.01); *B29L 2031/085* (2013.01)

(58) Field of Classification Search
CPC ....... F03D 1/0675; B29C 70/30; B29C 70/86; B29B 11/16; B29L 2031/085
USPC ..................... 416/229 R, 230, 241 R, 241 B
See application file for complete search history.

(56) References Cited

U.S. PATENT DOCUMENTS 3,666,600 A * 5/1972 Yoshino ........................ 156/382
3,691,000 A * 9/1972 Kalnin .......................... 428/114
(Continued)

FOREIGN PATENT DOCUMENTS

EP    1 543 941    6/2005
EP    1 925 436    5/2008
(Continued)

OTHER PUBLICATIONS

> Brondsted, Povl et al., < . Composite Materials for Wind Power Turbine Blades. Annu. Rev. Mater. Res. 2005. 35:505-38 [ > serial < online], [retrieved on Apr. 23, 2014]. Retrieved from the Internet <URL: http://www.annualreviews.org/doi/pdf/10.1146/annurev.matsci.35.100303.110641< >.*

(Continued)

*Primary Examiner* — Nathaniel Wiehe
*Assistant Examiner* — Wayne A Lambert
(74) *Attorney, Agent, or Firm* — Wood, Herron & Evans, LLP

(57) ABSTRACT

The present invention relates to a method of manufacturing a wind turbine blade or a part of a wind turbine blade. The method comprises arranging at least one layer of uncured resin pre-impregnated fibers, called prepregs, and at least one layer of cured fiber reinforced resin in an at least partly overlaying relationship, and curing the resin of the at least one layer comprising uncured resin. The at least one layer of cured fiber reinforced resin is assembled with at least one layer of uncured resin-preimpregnated fibers prior to being placed on a molding surface. The method may e.g. be used to manufacture a wind turbine blade shell member or a wind turbine blade spar member. The invention further relates to a wind turbine blade shell member or a wind turbine blade spar member manufactured by such a method. The invention further relates to a pre-form for use in a wind turbine blade, the pre-form comprising at least one layer of uncured resin pre-impregnated fibers and at least one layer of cured fiber reinforced resin in an at least partly overlaying relationship.

13 Claims, 4 Drawing Sheets

(51) Int. Cl.
  *B29B 11/16* (2006.01)
  *B29C 70/86* (2006.01)
  *B29L 31/08* (2006.01)

(56) References Cited

U.S. PATENT DOCUMENTS

| | | | | |
|---|---|---|---|---|
| 3,929,545 | A * | 12/1975 | Van Dyck et al. | 156/220 |
| 4,051,289 | A * | 9/1977 | Adamson | 428/113 |
| 4,065,340 | A * | 12/1977 | Dickerson | 156/154 |
| 4,177,306 | A * | 12/1979 | Schulz et al. | 428/107 |
| 4,548,859 | A * | 10/1985 | Kline et al. | 442/312 |
| 4,562,033 | A * | 12/1985 | Johnson et al. | 264/510 |
| 4,963,215 | A * | 10/1990 | Ayers | 156/286 |
| 5,022,845 | A * | 6/1991 | Charlson et al. | 425/403 |
| 5,064,705 | A * | 11/1991 | Donovan, Sr. | 428/121 |
| 5,089,348 | A | 2/1992 | Louderback | |
| 5,106,568 | A * | 4/1992 | Honka | 264/510 |
| 5,427,726 | A * | 6/1995 | White et al. | 264/137 |
| 5,755,558 | A * | 5/1998 | Reinfelder et al. | 416/230 |
| 5,766,534 | A * | 6/1998 | White et al. | 264/258 |
| 5,968,445 | A * | 10/1999 | McCarville et al. | 264/571 |
| 6,017,484 | A * | 1/2000 | Hale | 264/510 |
| 6,030,575 | A * | 2/2000 | Barron et al. | 264/517 |
| 6,245,275 | B1 * | 6/2001 | Holsinger | 264/257 |
| 6,306,239 | B1 * | 10/2001 | Breuer et al. | 156/245 |
| 6,447,705 | B1 * | 9/2002 | Fowler et al. | 264/255 |
| 6,508,909 | B1 * | 1/2003 | Cerezo Pancorbo et al. | 156/306.6 |
| 7,351,040 | B2 * | 4/2008 | Livingston et al. | 416/230 |
| 7,521,105 | B2 * | 4/2009 | Bech et al. | 428/60 |
| 2005/0127576 | A1 * | 6/2005 | Menendez et al. | 264/510 |
| 2005/0194724 | A1 * | 9/2005 | Krogager et al. | 264/510 |
| 2007/0107220 | A1 * | 5/2007 | Bakhuis et al. | 29/889.7 |
| 2007/0251090 | A1 * | 11/2007 | Breugel et al. | 29/889.7 |
| 2008/0159871 | A1 * | 7/2008 | Bech | 416/229 R |
| 2009/0175731 | A1 * | 7/2009 | Burchardt et al. | 416/229 R |
| 2009/0317585 | A1 * | 12/2009 | Bech | 428/113 |
| 2010/0062238 | A1 * | 3/2010 | Doyle et al. | 428/295.1 |
| 2010/0282404 | A1 * | 11/2010 | Ellis | 156/234 |

FOREIGN PATENT DOCUMENTS

| | | |
|---|---|---|
| JP | 59-129119 | 7/1984 |
| KR | 2004-0095522 | 11/2004 |
| WO | 2004078442 | 9/2004 |

OTHER PUBLICATIONS

Composites Manufacturing: Materials, Product, and Process Engineering. [online]. 1st edition. Boca Raton, FL: CRC Press LLC, 2002 [retrieved on * > Apr. 24, 2014 < ]. Retrieved from the Internet< URL: * > http://books.google.com/books?id=UfrO7p1o3HOC&pg=PA190&lpg=PA190&dq=rolling+prepreg+layers&source=bl&ots=ec3Em2jdT3&sig=pJvrrf-DVfVupgZzFp4Q426__6w1.*

Yoshiaki Sakaya et al., Official English Translation of JP 59129119 A, Jul. 25, 1984, translated Apr. 29, 2014.*

Dmitri Burdykin;1st Technical Examination and Search Report issued in priority Denmark Application No. PA 2009 00089; Sep. 5, 2009; 6 pages; Denmark Patent and Trademark Office.

Monica Lozza; International Search Report and Written Opinion issued in priority International Application No. PCT/DK2010/050012; Aug. 12, 2010; 13 pages; European Patent Office.

* cited by examiner

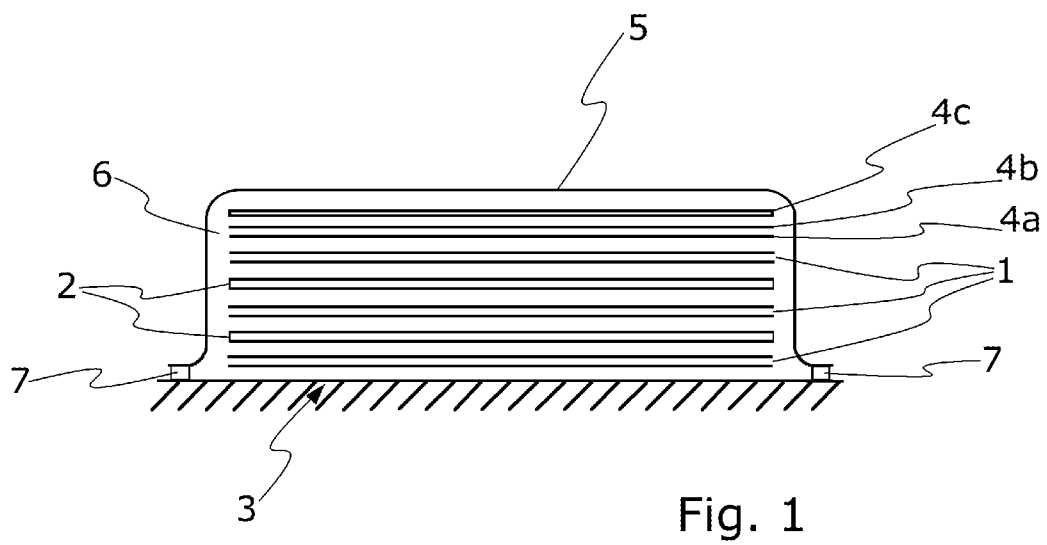
Fig. 1
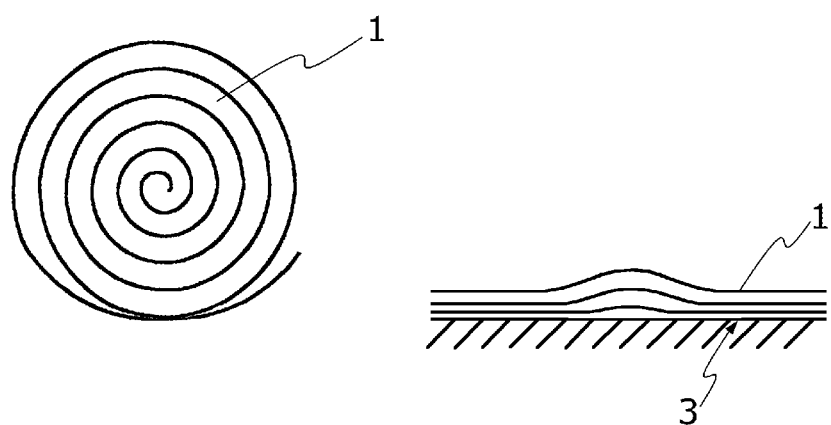
Fig. 2, known art

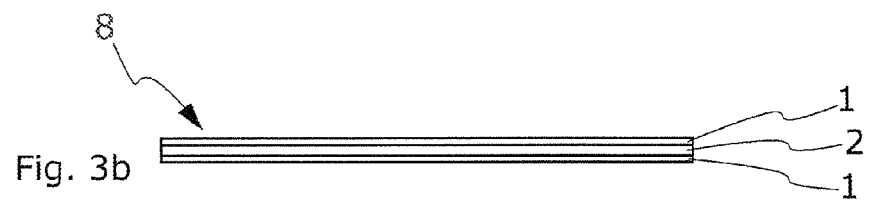
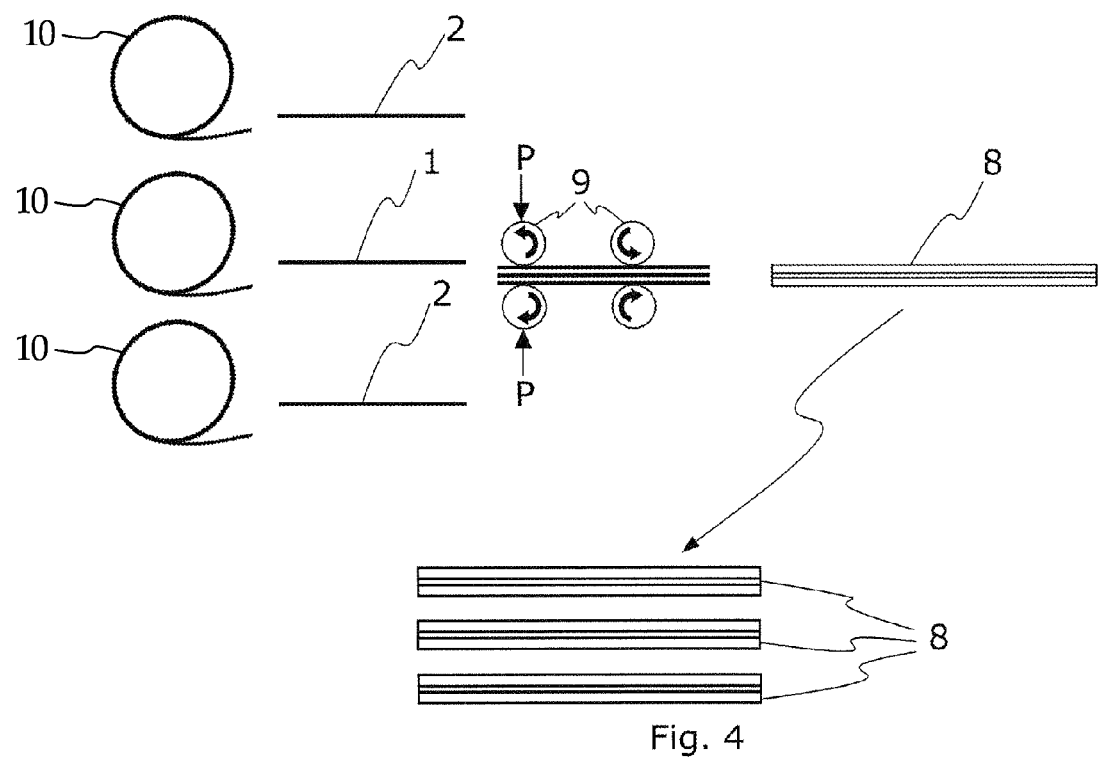

METHOD OF MANUFACTURING A WIND TURBINE BLADE BY EMBEDDING A LAYER OF PRE-CURED FIBRE REINFORCED RESIN

FIELD OF THE INVENTION

The present invention relates to a method of manufacturing a wind turbine blade or a part of a wind turbine blade, and in particular to a manufacturing method comprising use of layers of resin-preimpregnated fibres.

BACKGROUND OF THE INVENTION

Wind turbine blades, and parts thereof, are often manufactured from layers of resin-preimpregnated fibres, called prepregs, which are arranged on a moulding surface and subjected to vacuum and heat to cause a melting or softening of the resin followed by a curing thereof.

A drawback related to the use of prepregs is that the material is often delivered rolled-up, and the shape retention of the material may cause problems during the lay-up process because of wrinkles of the fibres being formed. This is especially the case for large product thicknesses, where wrinkles in lower layers can worsen the distortions in upper layers even further than what is caused by shape retention of the individual layers alone.

Furthermore, the prepregs have only limited sidewise stability, and care must be taken to avoid misalignment of the fibres during lay-up. The handling of prepregs can be particularly difficult when prepregs of large size are cut to the desired shape at one working surface and subsequently has to be moved to and arranged on the moulding surface.

Another drawback is that the curing is an exothermic process and therefore may result in disadvantageous built-in thermal stresses and deformations in the finished product, especially for products having a large thickness. A further disadvantage related to the exothermic curing process is that the heat may result in degradation of material which cannot withstand the actual temperatures which arise during the curing process.

Hence, an improved manufacturing method would be advantageous, and in particular a manufacturing method overcoming the above mentioned disadvantages would be advantageous.

OBJECT OF THE INVENTION

It is an object of the present invention to provide a method of manufacturing a wind turbine blade or a part of a wind turbine blade from prepregs by which method the average temperature increase across a given section during curing of the resin is lower than with corresponding known methods.

It is another object of the present invention to provide a method of manufacturing a wind turbine blade or a part of a wind turbine blade from prepregs by which method it is easier to prevent misalignment of the fibres during the lay-up process than with corresponding known methods. Such misalignment can be both in the thickness direction of the member being manufactured and sideways.

It is another object of the invention to provide a method of manufacturing a wind turbine blade or a part of a wind turbine blade from prepregs by which method it is easier to handle the layers during the lay-up process.

It is a further object of the present invention to provide an alternative to the prior art.

SUMMARY OF THE INVENTION

Thus, the above described object and several other objects are intended to be obtained in a first aspect of the invention by providing a method of manufacturing a wind turbine blade or a part of a wind turbine blade, the method comprising
 arranging at least one of layer of uncured resin pre-impregnated fibres and at least one layer of cured fibre reinforced resin in an at least partly overlaying relationship, and
 curing the resin of the at least one layer comprising uncured resin,
wherein the at least one layer of cured fibre reinforced resin is be assembled with at least one layer of uncured resin-preimpregnated fibres prior to being placed on a moulding surface.

By "cured" is preferably meant fully cured.

By such pre-assembling of the layers, the material may be easier to handle due to a larger stiffness caused by the cured layer(s), and because the fibres of the uncured layers are at least partly supported by the cured layer(s) so that it is easier to avoid misalignment of the fibres. This is particularly advantageous when layers of large size are cut to the desired shape at one working surface and subsequently has to be moved to and arranged on the moulding surface. Such pre-assembled layers are called pre-forms in the following; they may also be called slabs.

The incorporation of cured layers having a larger stiffness than the uncured layers also suppresses the tendency of uncured material delivered rolled-up to form wrinkles due to the shape retention of the material.

In an embodiment of the invention, layers of cured fibre reinforced resin are arranged on both sides of each layer of resin-preimpregnated fibres which makes it easier to handle the material during lay-up without the need to touch uncured resin. Furthermore, the cured layers are not sticky as the uncured ones, whereby it becomes easier to push the layers to the desired mutual position while arranging the pre-forms on the moulding surface. Alternatively, a plurality of layers of resin-preimpregnated fibres is arranged on top of each other, and a layer of cured fibre reinforced resin is arranged on the outer surface of each outer layer of resin-preimpregnated layers.

In another embodiment of the invention, layers of uncured resin-preimpregnated fibres are arranged on both sides of each layer of cured fibre reinforced resin. Hereby the adhesive effect of the uncured resin may make it easier to ensure that the layers stay in place during the lay-up process.

In another embodiment the layers are arranged so that one outer side surface of the assembled layers comprises cured resin, and the other outer surface comprises uncured resin. Hereby a compromise between the two last mentioned embodiments can be obtained. The uncured resin can act as an adhesive so that the mutual position of the layers is preserved.

The method may further comprise the steps of
 placing the at least one layer of resin-preimpregnated fibres and the at least one layer of cured fibre reinforced resin on a moulding surface,
 providing an airtight and flexible enclosure over the at least one layer of resin-preimpregnated fibres and the at least one layer of cured fibre reinforced resin,
 substantially evacuating air present in the enclosure, and
 heating the layers in the enclosure for a predefined period of time.

Hereby only one moulding surface is needed, and the thickness of the member being manufactured can be adjusted simply by varying the number of layers used.

In some embodiments of the invention, the assembling of the layers may comprise the step of applying a pressure on the layers. Hereby a stronger adhesive force is obtained.

Such a pressure may be applied by use of at least one roller. One roller may be used in combination with a plane surface or with one or more other rollers. The at least one roller may also be used to move the material, or the movement may be accomplished by other pulling or pushing means.

The thickness of each layer may be between 0.3 and 2 mm, such as between 0.3 and 0.5 mm, or between 0.5 and 1 mm, or between 1 and 2 mm. In some embodiments, the at least one layer of resin-preimpregnated fibres and the at least one layer of cured fibre reinforced resin have substantially the same thickness before assembly.

The fibres may be uni-directionally arranged, but any fibre orientation is considered to be covered by the scope of the invention. The fibres may also be arranged in more direction and/or interwoven within each or some of the layers. The fibre orientation may also differ between the layers, e.g. to obtain fibre reinforcement in several directions from layers or uni-directionally arranged fibres.

In some embodiments of the invention, the resin and/or the fibres may be the same types in the at least one layer of resin-preimpregnated fibres and the at least one layer of cured fibre reinforced resin. Hereby it may be possible to avoid abrupt changes in mechanical properties which could cause stress concentrations during loading. Similar properties may e.g. be obtained if the at least one layer of cured fibre reinforced resin is provided by curing at least one layer of resin-preimpregnated fibres of the same type as used for the remainder of the composite.

The at least one resin may be selected from: epoxy, polyester, vinyl ester, and phenol. The fibres may e.g. be carbon, glass or aramide fibres.

A method as described above may e.g. be used to manufacture a wind turbine blade shell member or a wind turbine blade spar member. It may e.g. be used to manufacture the trailing edge stringer or the connecting stringer of a wind turbine blade shell member.

A second aspect of the invention is related to a wind turbine blade shell member manufactured by a method as described above.

A third aspect of the invention is related to a wind turbine blade spar member manufactured by a method as described above.

A fourth aspect of the invention is related to a pre-form for use in a wind turbine blade, the pre-form comprising at least one of layer of uncured resin pre-impregnated fibres and at least one layer of cured fibre reinforced resin in an at least partly overlaying relationship, wherein the layers are arranged in a sequence which is starting and ending with a cured layer. Hereby it may be easier to handle the pre-form without the need to touch uncured resin.

Alternatively, the layers may be arranged in a sequence which is starting and ending with an uncured layer. Hereby the adhesive effect of the uncured resin may make it easier to ensure that the layers stay in place during the lay-up process.

The layers may alternatively be arranged in a sequence starting with a cured layer and ending with an uncured layer, or vice versa. Hereby a compromise between the two last mentioned embodiments can be obtained. The uncured resin can act as an adhesive so that the mutual position of the layer is preserved.

By pre-form is preferably meant a pre-shaped fibrous reinforcement which may be formed to desired shape and size prior to being placed on a moulding surface. Such a pre-form of cured and uncured layers may facilitate handling of the material during arrangement on the moulding surface. The pre-forms may also be made on a plane surface to that the final geometry is obtained during the subsequent step.

The pre-form may comprise a plurality of layers of uncured resin pre-impregnated fibres and a plurality of layers of cured fibre reinforced resin. However, it may also comprise only one layer of one or both types. The layers may be arranged alternately as cured and uncured, respectively, or vice versa.

The first, second, third and fourth aspects of the present invention may each be combined with any of the other aspects. These and other aspects of the invention will be apparent from and elucidated with reference to the embodiments described hereinafter.

BRIEF DESCRIPTION OF THE FIGURES

The method of manufacturing a composite member according to the invention will now be described in more detail with regard to the accompanying figures. The figures show one way of implementing the present invention and is not to be construed as being limiting to other possible embodiments falling within the scope of the attached claim set.

FIG. 1 shows schematically a method of manufacturing a composite member comprising layers of pre-cured material, FIG. 2 illustrates schematically an effect of the shape retention in known prepregs delivered rolled-up, FIG. 3 shows schematically the laminate structure of pre-forms comprising layers of prepregs with cured and uncured resin, FIG. 4 shows schematically a possible way of providing the pre-assembled layers in FIG. 3.

DETAILED DESCRIPTION OF AN EMBODIMENT

Figure 5:
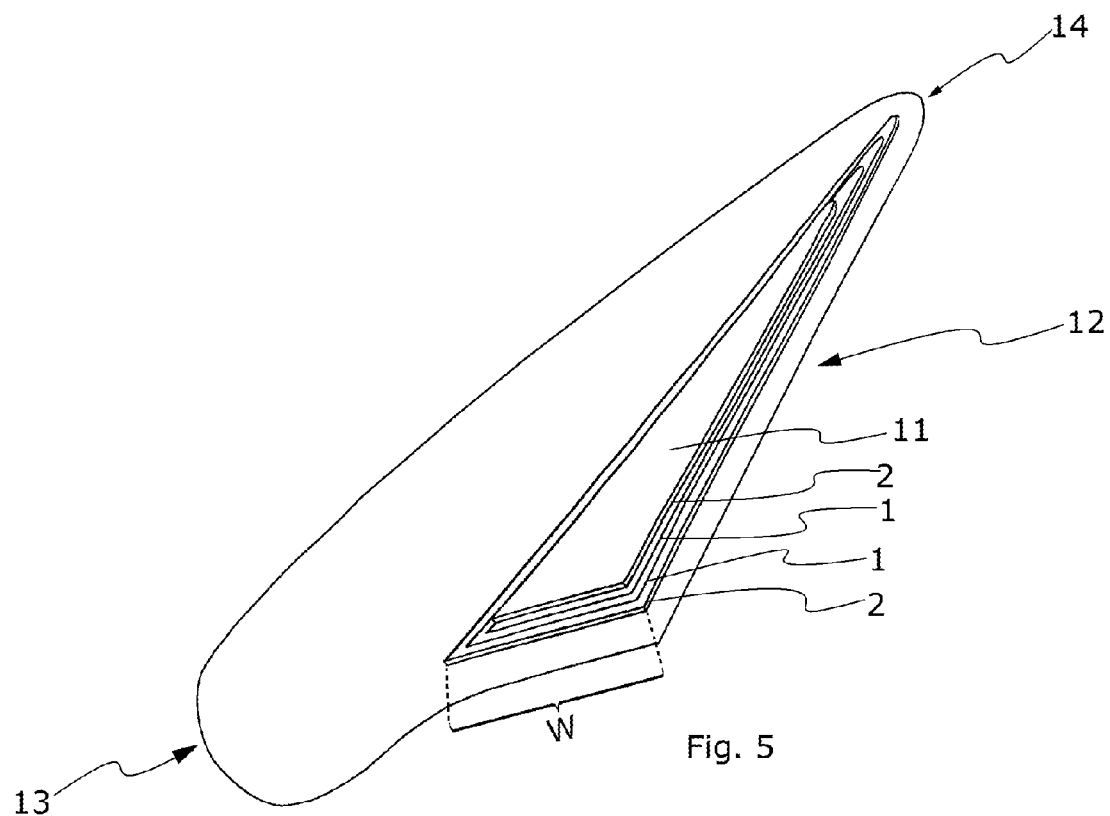
FIG. 5 shows schematically use of a method according to the present invention for the manufacturing a trailing edge stringer of a wind turbine blade shell.

A manufacturing method which is often used for the manufacturing of wind turbine blades or parts thereof, such as the blade shell, is by use of prepregs. A number of prepregs are arranged on top of each other and consolidated by application of vacuum and heat.

In a manufacturing method according to the present invention, the above described problems are counteracted by embedding of already cured material in the composite member. This cured material will typically be made from one or more layers of prepregs of the same or similar type as what is used for the remainder of the composite member. Hereby stress concentrations due to abrupt changes in mechanical properties through the thickness can be avoided.

A possible manufacturing method is shown schematically in FIG. 1. A predetermined number of uncured prepregs 1 and a number of layers of pre-cured fibre reinforced resin 2, which layers are all cut into the desired shape, are placed on a moulding surface 3. In FIG. 1 a stacking sequence of two layers of uncured prepreg 1 followed by one layer of cured material 2 is shown. The two types of layers are shown with different thicknesses for illustrative purposes only. In practice they typically have approximately the same thickness, typically in the order of 1 to 2 mm. In an alternative embodiment (not shown) the layers may be arranged so that every third or fourth layer is pre-cured. However, any stacking sequence is possible within the scope of the invention. A peel ply 4a is typically placed on top of the layers 1,2 to ensure that the surface of the manufactured member stays clean until a possible succeeding processing step. On top of the peel-ply 4a is typically a separation foil 4b, such as a porous plastic foil, and a breather layer 4c. All the layers 1,2,4a,4b,4c are covered by an airtight and flexible sheet 5 which is sealed to the moulding surface 3 by use of sealing tape 7 to provide an enclosure 6 from which air can be evacuated via a vacuum port (not shown) by use of a vacuum pump (not shown). When substantially all the air present air in the enclosure 6 has been evacuated, heat is applied for a predetermined period of time to cause a decrease in the viscosity of the preimpregnating resin followed by a curing thereof. A pressure may furthermore be applied in combination with the heat. The curing conditions are determined as for prepregs 1 without pre-cured layers 2 while taking into account the advantageous lower heat development. The conditions will depend on the materials used and the dimensions of the member being manufactured. The optimal curing conditions may e.g. be determined by experimentation and/or by computer simulations.

In an alternative manufacturing method, pre-forms are first made on a consolidation table, also called work plate, where they are laid up and consolidated but not cured, typically by use of vacuum as described above. This consolidation step does not necessarily comprise heating. The pre-forms are subsequently arranged on a moulding surface and cured as described above to obtain the final geometry. The pre-forms will be described in further details below.

The pre-cured layers 2 will not develop heat but will on the contrary absorb some of the heat caused by the exothermic curing process of the resin in the prepregs 1. This results in a lower average temperature during curing than for a composite member of the same thickness but made fully from uncured prepregs 1. The actual relative amounts of pre-cured material 2 and uncured material 1 should be chosen to ensure that the temperature development does not become damaging for the material itself or for neighbouring material. An appropriate sequence and number of layers 1, 2 for a given application may e.g. be determined by experimentation and/or by computer simulations.

In FIG. 1 the moulding surface is illustrated as plane, but in practise it is often curved, such as having double curvature. This is e.g. the case when the method is used for manufacturing of wind turbine blades or parts of wind turbine blades.

The resins will typically be one of epoxy, polyester, vinyl ester and phenol, but any resin material used for prepregs is covered by the present invention. The fibres may e.g. be glass, carbon or aramide.

Another problem related to the use of prepregs 1 is illustrated schematically in FIG. 2. The prepregs 1 are often delivered rolled-up, and the shape retention of the material means that it can be difficult to keep the prepregs 1 in place during the lay-up process, especially for large thicknesses of the composite member. The tendency to curl-back may result in wrinkles, i.e. local distortions or even fracture of the fibres. Such local defects can cause a lowering of mechanical properties, and they should therefore be revealed during quality control and may result in scrapping of the composite member. These problems will to a large extent be overcome by the embedding of pre-cured and thereby stiffer layers 2 since such layers 2 will assist in suppressing the tendency to curl of the uncured prepregs 1. The pre-cured material 2 may also be delivered rolled-up, but it has been found to have no shape retention.

The prepregs are typically cut to the desired size and shape at one working surface and subsequently, typically manually, moved to and arranged on the moulding surface. The uncured prepregs have a relatively low stiffness which makes them difficult to handle, especially for large sizes. In a method according to the present invention at least one layer of cured fibre reinforced resin is assembled with at least on layer of uncured resin-preimpregnated fibres prior to placing the layers on a moulding surface. Hereby the handling of the layers can be eased since it is not necessary to move the uncured, and thereby more flexible, layers individually from the working surface to the moulding surface. Hereby a better stability both in-plane and out-of-plane is obtained resulting in a reduced risk of fibre misalignment during the lay-up process.

In some embodiments of the invention, a step in the manufacturing method comprises assembly of one layer of uncured prepreg 1 with a layer of cured prepreg 2 on each side as shown schematically in FIG. 3a. This will result in a pre-form 8 having outer surfaces of cured material which can be handled without the need to touch uncured material. Such a material may also be easier to roll-up due to the non-sticking outer surfaces. Alternatively at least one of the outer layers may be uncured material which may make it easier to preserve the mutual position of two pre-forms arranged on top of each other. An example of such a pre-form is shown schematically in FIG. 3b. It will also be possible to pre-join more than three layers. Such layers may be alternating with respect to cured/uncured state, or more layers of the same type may be arranged on top of each other. The pre-cured layers 2 may also comprise more than one layer of fibres, such as being manufactured from a number of prepregs being arranged on top of each other.

The sticky effect of the uncured resin may be utilized to join the layers 1,2 shown in FIG. 3. An example of a possible joining process comprising use of rollers 9 is shown schematically in FIG. 4. The cured material and uncured prepregs are shown as being delivered on rolls 10, and the layers are typically cut to the desired shape before being placed on top other. Rollers 9 can be used to apply a compressive force P thereto to obtain some bonding strength across the interfaces between the layers 1,2. After passing the rollers 9, the pre-forms 8 are arranged on top of each other to form the final structure. This part of the process typically corresponds to the one described in relation to FIG. 1. Use of rollers 9 to join the layers may be an alternative to or used in addition to use of vacuum.

As described above, a potential problem with known art is that the curing of the resin is an exothermic process, and especially for large thicknesses the heat developed by the curing material elevates the temperature to above the oven temperature. This temperature increase may result in degradation of the material and/or thermal stresses being built into the composite member which can be critical during use due to the lowered load carrying capacity. By having pre-cured material substituting some of the uncured prepregs, the ratio between the energy releasing material, i.e. initially uncured, and energy absorbing material, i.e. cured, is offset towards more absorbing material. The material will therefore be less exothermic during curing resulting in a faster process without compromising the risk of material degradation and thereby lowered mechanical properties of the composite member.

Figure 6:
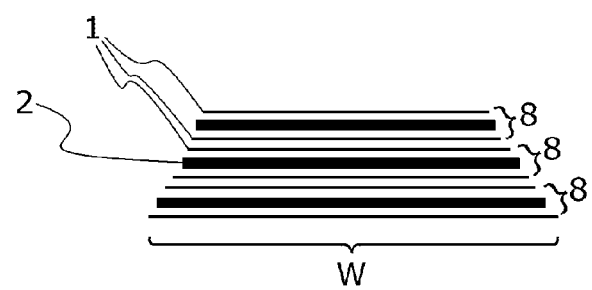
FIG. 6 shows schematically an exploded cross sectional view of the layers in the stringer in FIG. 5.

FIG. 5 shows schematically an embodiment of the invention in which cured layers 2 are embedded in the trailing edge stringer 11 of a wind turbine blade shell half 12. Two such halves 12 are subsequently glued together to form the final blade. The layers 1,2 used to build up the stringer 11 are typically tapered along the length direction with a maximum width w at the root end 13 in the order of 0.5 m and a decreasing width w in the order of 20 mm per m towards the tip end 14. The dimensions are related to the total length of the blade, and they may differ from the ones mentioned. In an embodiment of the invention, layers of decreasing widths are arranged on top of each other as shown schematically in FIG. 6 which is an exploded cross sectional view of the layers 1,2 in the stringer 11 in FIG. 5. The width may e.g. decrease from 0.5 m in the bottom layer (with respect to the figure) to 0.1 m in the top layer. In an alternative embodiment (not shown), the layers are arranged staggered so that a rhomb shaped cross section is obtained. Other possible geometries of the layers or lay-ups will be well-known to a person skilled in the art. The layers can either be arranged individually or they can be pre-assembled to pre-forms 8 as those shown in FIG. 3.

Figure 7:
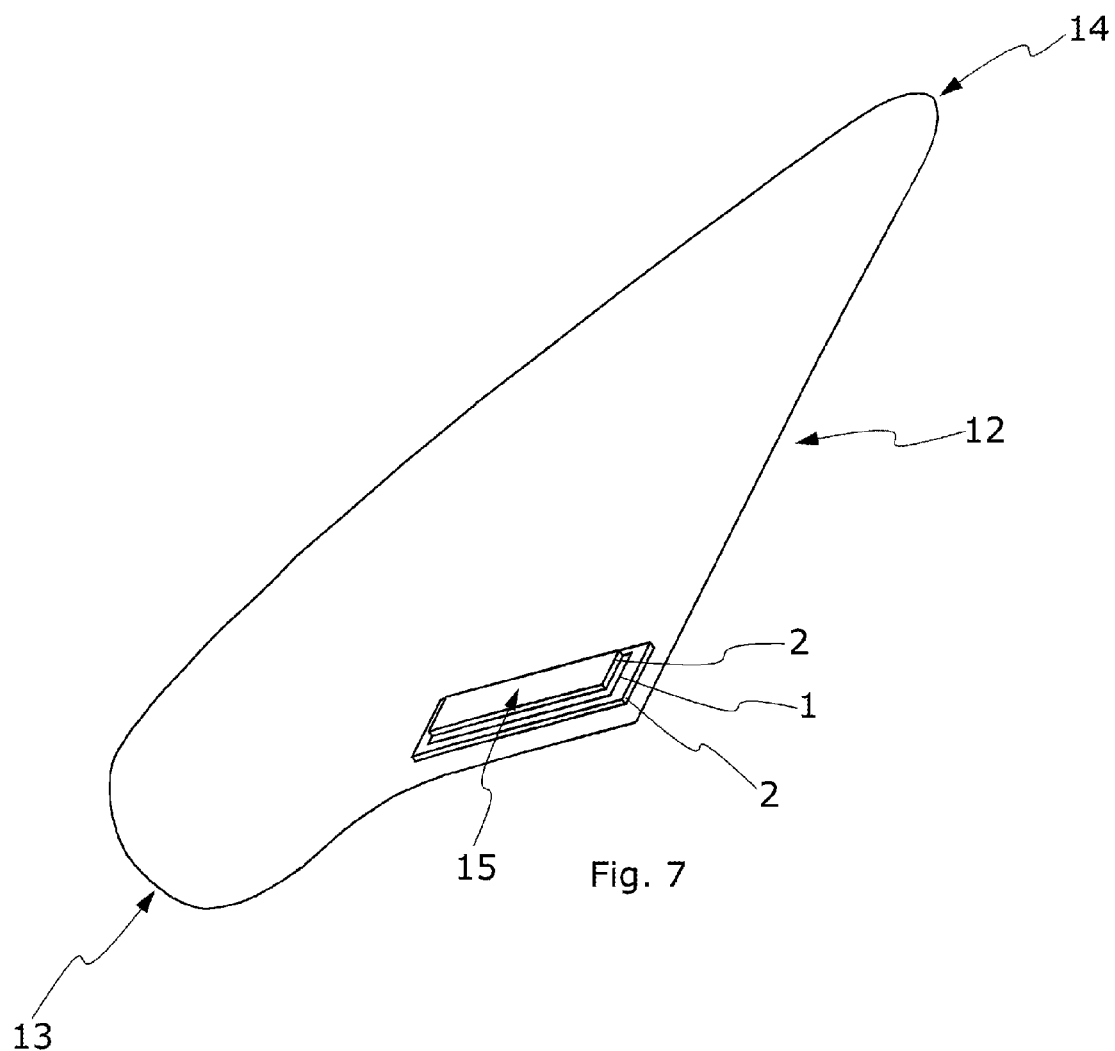
FIG. 7 shows schematically use of a method according to the present invention for the manufacturing a connecting stringer of a wind turbine blade shell.

A method as described for the trailing edge stringer may also be used to manufacture a connecting stringer 15 as shown schematically in FIG. 7.

When the above method is used to manufacture a composite member with a surface having a large curvature, and in particular a double-curvature, the layers are typically in the form of tapes (not shown). With known manufacturing methods, the fibre orientation is then easily distorted which may be substantially overcome by the use of pre-cured layers 2 as described above. The tapes may furthermore be held in place by successive layers being arranged with some overlap.

Although the present invention has been described in connection with the specified embodiments, it should not be construed as being in any way limited to the presented examples. E.g. the embedding of pre-cured material 2 as described above can be used at any position in the geometry of a wind turbine blade. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method of manufacturing a wind turbine blade or a part of a wind turbine blade, the method comprising:
   arranging at least one layer of uncured resin pre-impregnated fibres and at least one layer of fully cured fibre reinforced resin in an at least partly overlaying relationship,
   applying pressure on the layers arranged together to assemble the layers into a pre-form, the pre-form held together by tackiness of the at least one layer of uncured resin pre-impregnated fibres, the pre-form being assembled before placement of the pre-form on a moulding surface;
   handling the pre-form before placement of the pre-form on the moulding surface;
   moving the pre-form onto the moulding surface; and
   curing the resin of the at least one layer of uncured resin pre-impregnated fibres, thereby manufacturing the wind turbine blade or the part thereof from the pre-form, wherein curing the resin further comprises:
   absorbing heat energy from the exothermic process of curing resin with the at least one layer of fully cured fibre reinforced resin while the at least one layer of uncured resin pre-impregnated fibres release heat energy in the exothermic process, thereby minimizing the overall temperature increase that needs to be applied to cure the pre-form and also minimizing a risk of material degradation caused by excessive heat application during the curing.

2. The method according to claim 1, the method further comprising:
   providing an airtight and flexible enclosure over the at least one layer of uncured resin pre-impregnated fibres and the at least one layer of fully cured fibre reinforced resin,
   substantially evacuating air present in the enclosure, and
   heating the layers in the enclosure for a predefined period of time.

3. The method according to claim 1, wherein the pressure is applied by use of at least one roller.

4. The method according to claim 1, wherein the thickness of each layer is between 0.3 mm and 2 mm.

5. The method according to claim 1, wherein the at least one layer of uncured resin pre-impregnated fibres and the at least one layer of fully cured fibre reinforced resin have substantially the same thickness before assembly.

6. The method according to claim 1, wherein the fibres are uni-directionally arranged.

7. The method according to claim 1, wherein the resin and/or the fibres are the same types in the at least one layer of uncured resin pre-impregnated fibres and the at least one layer of fully cured fibre reinforced resin.

8. The method according to claim 1, wherein the at least one resin is selected from: epoxy, polyester, vinyl ester, and phenol.

9. The method according to claim 1, wherein the method is used to manufacture a wind turbine blade shell member.

10. The method according to claim 9, wherein the method is used to manufacture the trailing edge stringer or the connecting stringer of the wind turbine blade shell member.

11. The wind turbine blade shell member manufactured by a method according to claim 9.

12. The method according to claim 1, wherein the method is used to manufacture a wind turbine blade spar member.

13. The wind turbine blade spar member manufactured by a method according to claim 12.

* * * * *